July 17, 1923.
P. LO CASCIO
INDICATOR
Filed Dec. 10, 1919
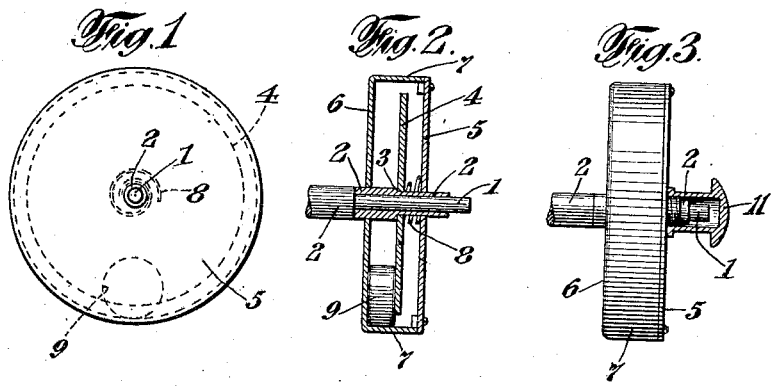
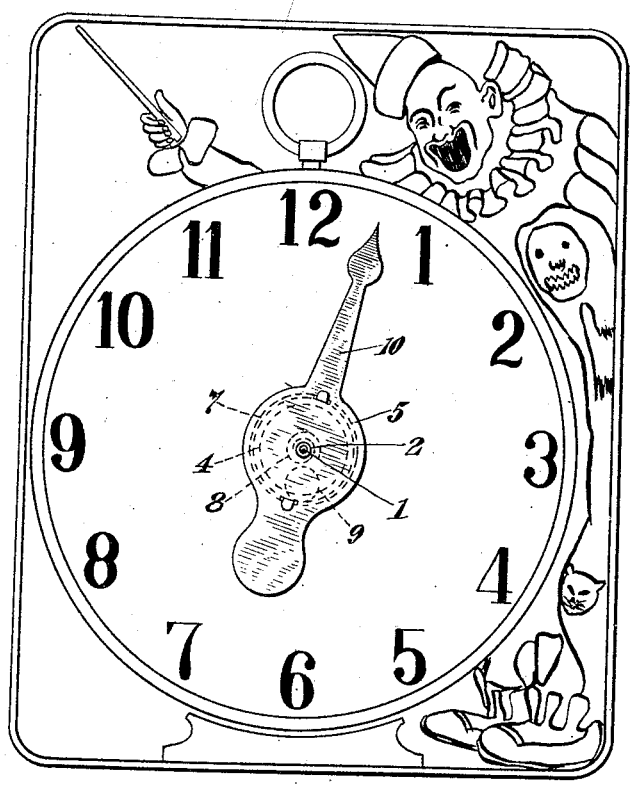
Inventor
Pasquale Lo Cascio
By his Attorneys
Prindle, Wright and Small Patented July 17, 1923.

1,462,028

UNITED STATES PATENT OFFICE.

PASQUALE LO CASCIO, OF BROOKLYN, NEW YORK, ASSIGNOR TO TOY BUSINESS CORPORATION, OF NEW YORK, N. Y., A CORPORATION OF NEW YORK.

INDICATOR.

Application filed December 10, 1919. Serial No. 343,888.

*To all whom it may concern:*

Be it known that I, PASQUALE LO CASCIO, a subject of the King of Italy, residing at Brooklyn, in the county of Kings and State of New York, have invented a certain new and useful Indicator, of which the following is a specification.

My invention relates to an indicator and has for its object to provide an indicator which can be maintained in any desired position in order to indicate or point out or record any desired data.

A further object of my invention is to provide an indicator which is unusually simple and inexpensive to manufacture.

A further object of my invention is to provide an indicator which will perform its function by a simple movement of one of its parts.

A further object of my invention is to provide an indicator which utilizes the action of gravity on a weight to indicate as desired.

Other and further objects of the invention will be apparent from the following description and from the accompanying drawings of embodiments thereof, in which,—

Figure 1 is a front elevation of an embodiment;

Figure 2 a central vertical section of the embodiment of Figure 1;

Figure 3 a side view partly in section of an embodiment; and

Figure 4 an application of an embodiment to a game.

Similar reference characters refer to similar parts throughout the drawings.

In the embodiment of Figures 1 and 2, a spindle 1 is indicated on which rotates a hollow shaft 2 having an obstruction or projection of any desired kind thereon as a shoulder 3. A plate 4 is mounted on shaft 2 with its movement along shaft 2 limited in any desired manner as by said shoulder 3 or by being fixed to shaft 2. A rotatable member shown in this embodiment as composed of sides 5 and 6 joined by end 7 is mounted slidably on shaft 2 with plate 4 between sides 5 and 6. Between plate 4 and one side as side 5 is a spring 8, and between plate 4 and the other side as side 6 is a weight 9.

Spring 8 normally tends to force said rotatable member to the right (Figure 2) thus clamping weight 9 between plate 4 and side 6. The action of gravity on weight 9 will turn the rotatable member until weight 9 is at its lowest possible position as illustrated in Figures 1 and 2 where it will remain. If the rotatable member is turned to a new indicating position and pressed to the left (Figure 2) while in that position, weight 9 will be released and fall to the bottom of the rotatable member, where it will be clamped as soon as the pressure is removed from the rotatable member, therefore normally maintaining said rotatable member in said new indicating position and returning it to that position no matter how much it is rotated.

The indicator is applicable to a variety of uses and may be utilized to record the extreme of upward swing of a hand attached thereto by pressing the rotatable member to the left (Figure 2) when the maximum swing is attained.

One application of the indicator is illustrated in Figure 4 of the drawings which shows a toy called a magic clock. The operator invites anyone to state the time he wishes the magic clock to indicate. If the reply is 12:30, the operator moves hand 10 to 12:30, presses inwardly the rotatable member to which the hand is secured, and then gives the hand a quick twirl of several revolutions in either direction. As weight 9 went to the bottom of the rotatable member when the member was pressed inwardly and remains clamped in that position between plate 4 and side 6, the hand always will return to 12:30 no matter how many times it is twirled or the direction of twirl. In like manner, if 4 was the number called, hand 12 would be turned to 4, the rotatable member on which the hand is mounted pressed inwardly, and thereafter the hand always would point to 4 until the weight was released and clamped at a different part of the rotatable member.

Figure 3 illustrates a button 11 secured to the outer face of the rotatable member as a pressure applying point when it is desired to release weight 9.

Many modifications of my invention will be apparent to those skilled in the art without departing therefrom or from the scope of the claims, my invention not being limited to the embodiments chosen for purposes of illustration, but comprising a rotatable member having its position determined by a movable weight adapted to be maintained in any desired relation therewith.

Having described embodiments of my invention what I claim and desire to secure by Letters Patent is:

1. In an indicator, a rotating member, means to maintain said rotating member in desired position comprising a weight detachable from and movable with respect to said rotating member, and means to hold and to release said weight with relation to said rotating member.

2. In an indicator, a rotating member, means to maintain said rotating member in desired position comprising a weight movable with respect to said rotating member, and means to hold and to release said weight with relation to said rotating member comprising a spring pressed plate.

3. In an indicator, a hollow rotating member, means to maintain said rotating member in desired position comprising a weight within said member and movable with respect thereto, and means to hold and to release said weight with relation to said rotating member.

4. In an indicator, a hollow rotating member, means to maintain said rotating member in desired position comprising a weight within said member and movable with respect thereto, and means to hold said weight against said member and to release it therefrom.

5. In an indicator, a hollow rotating member, means to maintain said rotating member in desired position comprising a weight within said member and movable with respect thereto, and means to hold said weight against said member and to release it therefrom comprising a spring pressed plate within said member.

6. In an indicator, a rotating member, means to maintain said rotating member in desired position comprising a weight detachable from and movable with respect to said member, means to hold said weight against said rotating member, and means to release said weight for movement with respect to said rotating member by pressure on said rotating member.

7. In an indicator, a rotating member, means to maintain said rotating member in desired position comprising a weight movable with respect to said member, means to hold said weight against said rotating member comprising a spring pressed plate, and means to separate said member and plate and release said weight by pressure on one of said holding parts.

8. In an indicator, a rotating member, means to maintain said rotating member in desired position comprising a weight movable with respect to said member, means to hold said weight against said rotating member comprising a spring pressed plate, and means to separate said member and plate and release said weight by pressure on said member.

9. In an indicator, a shaft, a plate mounted on said shaft, means on said shaft to limit the movement of said plate along said shaft, a rotatable member on said shaft having its sides on either side of said plate, a spring between said plate and one of said sides, and a movable weight between said plate and the other of said sides.

10. In an indicator, a spindle, a hollow shaft adapted to be mounted on said spindle, a plate mounted on said shaft, means on said shaft to limit the movement of said plate along said shaft, a rotatable member on said shaft having its sides on either side of said plate, a spring between said plate and one of said sides, and a movable weight between said plate and the other of said sides.

In testimony that I claim the foregoing, I have hereunto set my hand this 9th day of December, 1919.

PASQUALE LO CASCIO.